May 28, 1963
L. H. COOK ET AL
3,091,637
DUAL CYCLE UREA SYNTHESIS PROCESS
Filed May 17, 1960
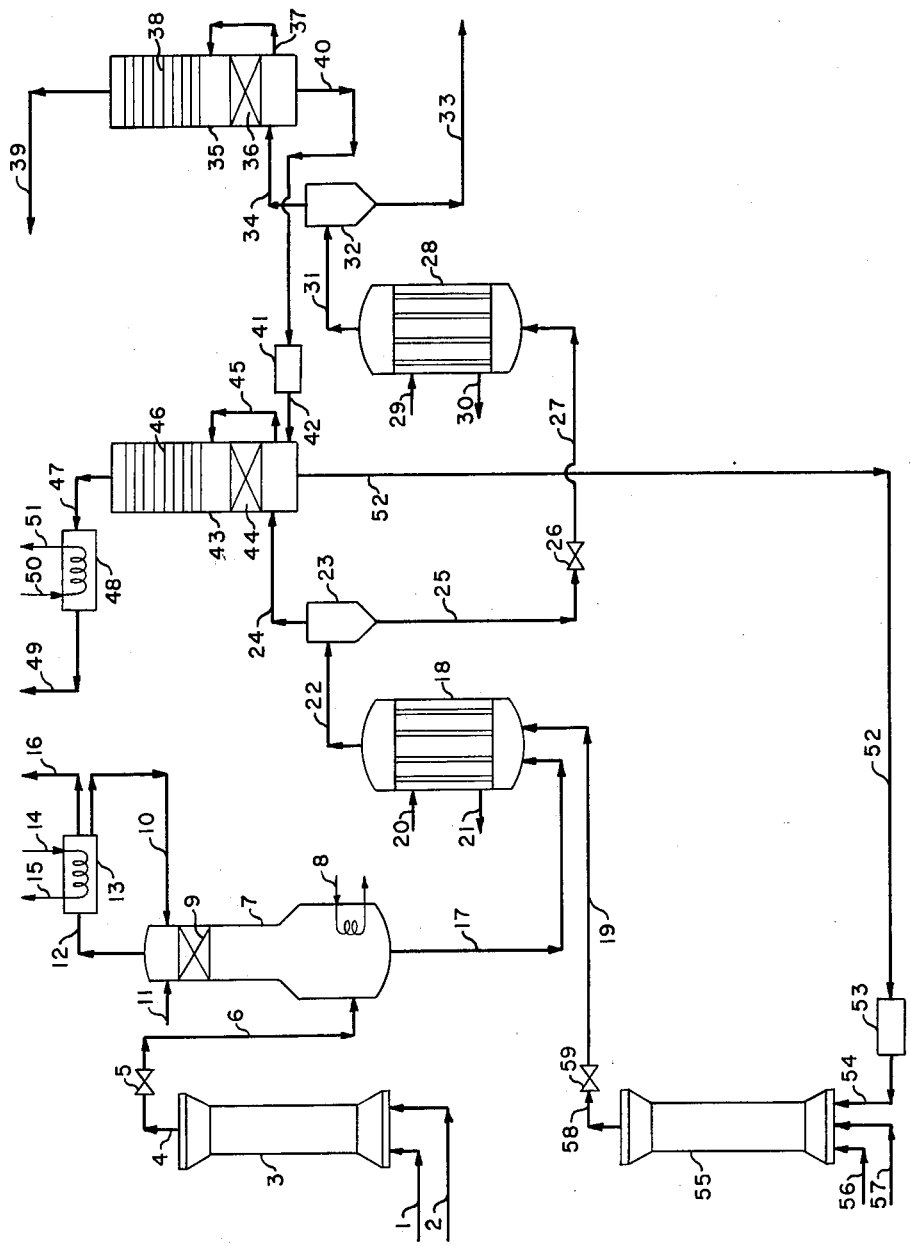
LUCIEN H. COOK
ROBERT K. FIDLER
INVENTORS.
BY J. T. Chaboty
AGENT

3,091,637
DUAL CYCLE UREA SYNTHESIS PROCESS
Lucien H. Cook, Port Washington, and Robert K. Fidler, Palisades, N.Y., assignors to Chemical Construction Corporation, New York, N.Y., a corporation of Delaware
Filed May 17, 1960, Ser. No. 29,613
5 Claims. (Cl. 260—555)

This invention relates to the synthesis of urea from ammonia and carbon dioxide. A novel process has been developed, in which the total synthesis is carried out in two separate and simultaneous phases. In the first phase, the sole reactants are ammonia and carbon dioxide. This phase is carried out with a large excess of ammonia, which results in a high conversion of reactants to urea. Unconverted reactants are processed to provide streams of pure ammonia and aqueous ammonium carbamate solution. The ammonium carbamate solution is reacted with additional ammonia and carbon dioxide in the second phase, to yield a stream containing additional urea. Unconverted second phase reactants are processed and recycled in combination with unconverted first phase reactants.

Thus an overall result is achieved, in which the advantages of urea synthesis with a large excess of ammonia are combined with the advantages of complete recycle urea synthesis. The two phase or dual cycle synthesis thus results in large overall improvement in operating efficiency and economy. The novel combination of process steps in the present invention avoids the large scale gas recompression requirements of the prior art, since the bulk of excess ammonia is recovered either as a readily condensable gas at elevated pressure, or together with unconverted carbon dioxide as readily compressible aqueous ammonium carbamate solution.

Urea is synthesized commercially by the reaction of ammonia with carbon dioxide at elevated pressure and temperature. In this process ammonium carbamate is formed as an intermediate compound, which then loses water to yield urea. The formation of the intermediate ammonium carbamate is a rapid reaction under the usual process conditions, and readily goes to completion. However, the subsequent dehydration of ammonium carbamate to yield urea and water is a comparatively slow reaction under the usual process conditions, and does not readily go to completion in practice. Thus the effluent from the high-pressure urea synthesis vessel contains a significant proportion of ammonium carbamate as well as urea product. The ammonium carbamate is readily separated from the liquid urea product by heating, which decomposes the ammonium carbamate and generates an off-gas containing ammonia and carbon dioxide. The subsequent processing of this off-gas is relatively difficult, since at lower temperatures and pressures the components ammonia and carbon dioxide readily recombine to form ammonium carbamate as a solid. Various procedures for disposal or recycle of the off-gas have been devised in the past. Two important processes for complete recycle of the off-gas as pure ammonia and ammonium carbamate solution are disclosed in U.S. patent applications Serial No. 5,379, filed January 29, 1960, and Serial No. 6,644, filed February 4, 1960.

Other procedures utilized in commercial practice include direct hot gas recycle, aqueous or inert mineral oil slurry, and utilization of the off-gas in other processes such as ammonium nitrate manufacture. Thus a broad range of technical solutions to the problem of off-gas recycle is available. Each of these various approaches to off-gas recycle or utilization possesses inherent advantages and disadvantages. It is felt that the processes disclosed in the applications mentioned supra will eventually replace all other recycle processes.

One of the basic principles of urea synthesis technology is that as the excess proportion of ammonia over stoichiometric requirement is increased, the yield or percent conversion based on carbon dioxide feed is increased. Thus where the overall ammonia-carbon dioxide ratio is 3:1, the percent conversion will be about 45% to 50%, while an overall ratio of 6:1 will result in 75% to 80% conversion. However, utilization of a 6:1 or higher ratio in urea synthesis also results in generation of a larger proportion of off-gas. Thus the installation of urea synthesis facilities using a high excess of ammonia has been limited.

In the present invention, a combination of urea synthesis process steps has been devised in which the higher percent conversion attained with a large excess of ammonia is combined with the complete recycle processes disclosed in the patent applications mentioned supra, in a novel manner whereby the process advantages of both systems are obtained to the fullest extent. The resultant combined process achieves a significant overall improvement in urea synthesis process efficiency, with reduced power requirements. Another advantage of the present invention is that gas recompression is reduced to a minimum. This is a highly important feature, since power requirements and capital costs for gas compression are much greater than for equivalent liquid compression. The bulk of excess ammonia is recovered at a relatively high pressure, and consequently this ammonia is readily condensed to liquid prior to further compression and recycle. All unconverted carbon dioxide is recovered as ammonium carbamate in aqueous liquid solution, which is also readily and cheaply compressed and recycled.

The most significant advantage of the present invention, however, resides in the fact that two separate urea synthesis autoclaves are employed in the process. The first autoclave receives feed streams of ammonia and carbon dioxide, with a high excess of ammonia being employed, and achieves a very high percent conversion to urea. The effluent from the first reactor is combined with the effluent from the second reactor, and the resultant stream is processed to yield product urea solution, pure ammonia, and aqueous ammonium carbamate solution. The aqueous ammonium carbamate solution is then recycled to the second reactor, together with additional ammonia and carbon dioxide. This second reactor is operated with a relatively low proportion of excess ammonia, and achieves a lower percent conversion than the first reactor. It should be noted that increasing the proportion of excess ammonia in the second reactor would not achieve any large increase in conversion, due to the presence of water in the ammonium carbamate recycle stream. However, a yield of urea is achieved in the second reactor which, when combined with the very high yield of the first reactor, results in an overall process yield which is considerably and significantly higher than prior complete recycle processes.

Thus if a conventional 6 to 1 ratio urea process is operated with complete recycle of aqueous ammonium carbamate solution to the same reactor, the overall process yield declines sharply. As a consequence of this, the prior art has not been able to provide a 6 to 1 process with complete recycle which is competitive with other processes of urea synthesis. Utilization of the process of the present invention now permits the modification of existing 6 to 1 urea synthesis facilities to provide an economical full recycle operation.

It is an object of this invention to provide an improved process of urea synthesis.

Another object is to produce urea more efficiently in a complete recycle process.

A further object is to provide complete recycle in a urea synthesis process in which a large excess of ammonia is employed.

Still another object is to provide a complete recycle urea synthesis process which employs a large excess of ammonia in synthesis while avoiding significant gas recompression.

An additional object is to produce urea in a dual cycle process using two interdependent synthesis cycles.

These and other objects and advantages of the process of the present invention will become apparent from the description which follows. Referring to the FIGURE, ammonia feed stream 1 and carbon dioxide feed stream 2 are passed into high pressure autoclave 3 at urea synthesis pressure of between about 2000 p.s.i.g. to 6000 p.s.i.g. The molar ratio of stream 1 to stream 2 is maintained between about 4 to 1 to 10 to 1, preferably at 6 to 1, so as to provide considerable excess of ammonia and thereby achieve high conversion to urea. The temperature in vessel 3 is the equilibrium temperature attained under the particular process conditions, however it is maintained between about 320° F. to 430° F. to promote reaction rate while avoiding biuret formation.

The resulting urea-containing effluent stream is removed from autoclave 3 via 4, and is first passed through pressure reducing valve 5. The effluent stream is reduced to a pressure level between about 200 p.s.i.g. to 400 p.s.i.g., and is passed via 6 to excess ammonia separation vessel 7. The function of vessel 7 is to remove excess ammonia from stream 6 as a pure off-gas, however, in some instances particularly when the molar ratio of streams 1 and 2 is 6 to 1 or lower, vessel 7 may be omitted and its function performed by processing units to be described infra. The details of operation of vessel 7 are substantially described in U.S. Patents Nos. 2,894,878 and 2,716,629, and therefore the operation of vessel 7 will now be described only in general terms.

The effluent stream 6 enters the lower portion of vessel 7 and is heated by internal steam coils 8. This removes excess free ammonia as an off-gas which rises through the upper column section of vessel 7. The gas stream contains a slight amount of carbon dioxide, which is removed by scrubbing the gas stream with liquid ammonia reflux in upper packed section 9. The liquid ammonia is admitted via 10, while a small quantity of water may also be admitted via 11 to prevent the formation of solid ammonium carbamate deposits in packed section 9. Cooling coils, not shown, may be provided in the upper section of vessel 7 for temperature control. A pure ammonia off-gas stream is removed from the top of vessel 7 via 12, and condensed to liquid ammonia in condenser 13. This off-gas stream is readily condensed to liquid at the pressure of 200 p.s.i.g. to 400 p.s.i.g., preferably about 260 p.s.i.g., at which this section of the process is normally operated. Cooling is provided by cooling water or other coolant admitted via 14 and withdrawn via 15. A portion of the condensed liquid ammonia is recycled to vessel 7 via 10 as reflux, while the balance is transferred to main process recycle or ammonia storage via 16.

Returning to the lower portion of vessel 7, the residual effluent stream, now with lowered free ammonia content, is removed via 17 and passed into ammonium carbamate decomposer 18. An additional urea synthesis effluent stream 19, also containing ammonium carbamate, is passed into vessel 18 together with stream 17. Unit 18 is typically a shell and tube heat exchanger, with steam admitted via 20 and condensate removal via 21. The function of unit 18 is to decompose ammonium carbamate present in streams 17 and 19 by heating, which liberates ammonia and carbon dioxide and thereby forms a gas phase.

The mixed gas-liquid stream is removed from vessel 18 via 22, and is passed into decomposer separator vessel 23. Vessel 23 is a known type of gas-liquid separator, preferably a gravity separator of the cyclonic type. The off-gas is removed from vessel 23 via 24, while the residual liquid stream is removed via 25 and passed through pressure reducing valve 26. Valve 26 serves to lower the liquid stream pressure to a final value between about 5 p.s.i.g. to 50 p.s.i.g. The resulting liquid stream 27, now at reduced pressure and consisting primarily of an aqueous urea solution with a slight amount of residual ammonium carbamate and free ammonia, is passed through low pressure ammonium carbamate decomposer vessel 28. Vessel 28 has a function and operation similar to unit 18 previously described. Heating steam is admitted via 29 with condensate removal via 30. The temperature of the urea-containing stream in unit 28 is thus maintained between about 180° F. to 250° F., and at this temperature level and under the reduced pressure condition, the balance of residual ammonium carbamate is decomposed with minimum biuret formation.

The resulting mixed gas-liquid stream 31 is passed through separator 32, and a final product aqueous urea solution is withdrawn via 33. The mixed ammonia-carbon dioxide off-gas is recovered from separator 32 via 34, and is passed into low pressure condenser-stripper 35. The details of the operation of unit 35 are basically as described in U.S. patent application No. 6,644 cited supra, and consequently will only be briefly discussed. Unit 35 is provided with lower packed section 36 over which aqueous ammonium carbamate solution 37 is recycled. Input mixed gas stream 34 is scrubbed in packed section 36 at a temperature between about 125° F. to 140° F., whereby the bulk of carbon dioxide present is dissolved in the liquid phase. The balance of residual carbon dioxide content is removed from the gas stream in upper reflux section 38, and a final ammonia gas stream free of carbon dioxide is removed via 39 at a temperature below 100° F. Ammonia stream 39 is thereafter preferably compressed and cooled to condense liquid ammonia which is then recycled. These well-known process steps are not shown.

An aqueous ammonium carbamate solution is also withdrawn from unit 35 via 40, and is compressed in pump 41 prior to being admitted via 42 to the lower section of high pressure condenser-stripper 43. Unit 43 has a function and operation similar to unit 35 described supra, except that an operating pressure between about 200 p.s.i.g. to 400 p.s.i.g. is maintained in unit 43. The mixed off-gas from separator 23 is passed via 24 into unit 43 below packed section 44, and is scrubbed in section 44 at a temperature between about 200° F. to 220° F. by recycling aqueous ammonium carbamate solution 45. This scrubbing serves to remove the bulk of carbon dioxide from the gas phase, and the balance of carbon dioxide is removed from the rising gas stream in upper reflux section 46. A final ammonia stream free of carbon dioxide is removed via 47 at a temperature below 145° F., and due to the relatively high pressure level this stream is directly condensed to liquid ammonia in condenser 48. Condenser 48 has an operation similar to condenser 13 described supra, and produces liquid ammonia stream 49 suitable for direct recycle by heat exchange with coolant admitted via 50 and withdrawn via 51.

An aqueous ammonium carbamate solution is also withdrawn from unit 43 via 52, and is compressed in pump 53 to urea synthesis pressure between about 2000 p.s.i.g. to 6000 p.s.i.g. and then passed via 54 into second urea synthesis autoclave 55. Unit 55 also receives input streams 56 and 57 consisting of additional ammonia and carbon dioxide respectively. The feed rates of streams 56 and 57 are adjusted relative to stream 54 to provide a ratio of ammonia to carbon dioxide preferably between 2.5 to 1 to about 4 to 1. A higher ratio is not employed in autoclave 55 due to the fact that feed stream 54 contains considerable water, and consequently overall conversion is not aided significantly by higher excess ammonia, as discussed supra. Hence a lower conversion to urea is achieved in unit 55 than in unit 3.

The urea synthesis effluent stream 58 is removed from autoclave 55 and passed through pressure reducing valve 59. Here the stream pressure is lowered to a final value between about 200 p.s.i.g. to 400 p.s.i.g., and the effluent stream now passes as stream 19 into the balance of the processing as described supra.

An example of an industrial application of the process of the present invention will now be described. In the following example, all flow quantities are in pounds per hour.

Example

The process of the present invention was applied and utilized to modify an existing urea facility, whereby an established 6 to 1 ratio plant with excess ammonia separation and partial recycle was converted to a full recycle plant of greatly increased capacity.

A reactant molar feed ratio of 5.6 to 1 was provided in the existing urea synthesis autoclave. Actual feed rates were 21,550 pounds per hour ammonia and 9,900 carbon dioxide, and operating conditions of 3500 p.s.i.g. and 365° F. were maintained in the autoclave. The autoclave effluent contained 10,120 urea, together with 3,070 water, 2,470 carbon dioxide and 15,700 ammonia. Thus a 75.2% conversion was attained. The carbon dioxide and part of the ammonia were combined as ammonium carbamate. Effluent pressure was reduced to 260 p.s.i.g. and the stream was passed through an excess ammonia separator, whereby 11,780 ammonia was removed from the effluent stream at 260 p.s.i.g. This ammonia was condensed and recycled. Operation of the excess ammonia separator necessitated the addition of 670 water to the process stream, and consequently the effluent stream from the excess ammonia separator contained 3,740 water, as well as 10,120 urea, 4,000 ammonia, and 2,470 carbon dioxide.

This stream was combined with the effluent stream from the added urea synthesis autoclave. This second autoclave effluent stream contained 5,760 urea, 9,800 ammonia, 4,230 carbon dioxide and 6,000 water. The carbon dioxide and part of the ammonia were combined as ammonium carbamate. The resulting combined effluents stream was passed through the first stage of ammonium carbamate decomposition at 266° F. and 250 p.s.i.g., and then through the first stage separator. The separator off-gas, containing 10,960 ammonia, 5,120 carbon dioxide, and 1,440 water, was passed to the first condenser stripper. The separator liquid effluent, containing 15,880 urea, 2,840 ammonia, 1,590 carbon dioxide and 8,300 water, was passed through the second stage of ammonium carbamate decomposition after stream pressure reduction to 15 p.s.i.g.

The second decomposition stage was operated at 15 p.s.i.g. and 200° F., and the process stream was then passed through the second stage separator. A final product liquid effluent stream consisting of 15,880 urea and 5,480 water was recovered from the second stage separator.

This separator also produced an off-gas containing 2,840 ammonia, 1,590 carbon dioxide, and 2,820 water. This off-gas was passed to the second condenser stripper provided with a lower packed section in which the gas stream was scrubbed at 135° F. with an aqueous ammonium carbamate solution. This solution was recycled to the packed section after cooling to 130° F. The rising gas stream was further cooled and refluxed in the upper bubble plates section of the unit to a final temperature maintained below 55° F., and finally a gas stream containing 1,090 ammonia and free of carbon dioxide was recovered from the top of the unit. A condensed ammonium carbamate solution containing 1,750 ammonia, 1,590 carbon dioxide and 2,820 water was withdrawn from the bottom of the unit, compressed to 250 p.s.i.g. and passed into the bottom of the first condenser stripper.

The first condenser stripper also received the first stage off-gas, as specified supra. The rising gas stream was scrubbed at 210° F. in the lower packed section of the unit with an aqueous ammonium carbamate solution which was recycled after cooling to 205° F. The gas stream was then further cooled and refluxed in the upper portion of the unit to a final temperature maintained below 115° F. A final gas stream was withdrawn from the top of the unit containing 5,310 ammonia and free of carbon dioxide.

A condensed ammonium carbamate solution containing 7,400 ammonia, 6,710 carbon dioxide and 4,260 water was withdrawn from the bottom of the first condenser stripper, compressed to 3500 p.s.i.g., and passed into the added urea synthesis autoclave together with 5,660 ammona and 1,750 carbon dioxide. Thus an overall ammonia to carbon dioxide molar feed ratio of 4.0 to 1 was provided, and under urea synthesis reactor operating conditions of 3500 p.s.i.g. and 365° F. an acceptable 50% conversion to urea was attained. The reactor effluent was reduced in pressure to 250 p.s.i.g. and this stream was combined with the residual effluent from the first autoclave as specified supra, and processed to recover urea solution free of unconverted reactants as described supra. Overall process efficiency, for both autoclaves combined, was 63.5% conversion.

This invention is of course not to be limited to the processing described in the above example, as numerous variations within the scope of the present invention will occur to those skilled in the art. Thus for an original or grass-roots installation, higher ratios of excess ammonia are in general to be preferred as providing greater overall yields with minimal increases in capital and operating costs. In some cases however, it is more advantageous to eliminate the excess ammonia separator and accomplish its function in the first stage condenser-stripper. Other variations will occur to those skilled in the art.

We claim:

1. Process of urea synthesis comprising reacting first streams of ammonia and carbon dioxide in a molar ratio between about 4 to 1 and 10 to 1 at a pressure between about 2000 p.s.i.g. to 6000 p.s.i.g. and a temperature between about 320° F. to 430° F. to produce a first urea-containing stream, reducing the pressure of said stream to a level between about 200 p.s.i.g. to 400 p.s.i.g. combining said stream with a second urea-containing stream, decomposing ammonium carbamate in the combined stream by heating, separating a first off-gas containing ammonia and carbon dioxide from the combined stream, reducing the pressure of the residual combined stream to a level between about 5 p.s.i.g. to 50 p.s.i.g., decomposing the balance of ammonium carbamate in the residual combined stream by heating at a temperature between about 180° F. to 250° F., separating a second off-gas containing ammonia and carbon dioxide from the final residual combined stream, said final residual combined stream consisting of product aqueous urea solution substantially free of process reactants, scrubbing and partially condensing said second off-gas by contact with a second aqueous ammonium carbamate solution at a temperature between about 125° F. to 140° F., further cooling and refluxing residual second off-gas to a final temperature below 100° F. whereby carbon dioxide is substantially completely removed from the residual gas phase and a final residual second off-gas stream is recovered substantially free of carbon dioxide, cooling and recycling a portion of said second aqueous ammonium carbamate solution, compressing the balance of said second solution to the pressure level of said first off-gas, contacting said second solution and said first off-gas with a first aqueous ammonium carbamate solution at a temperature between about 200° F. to 220° F., whereby said first off-gas is scrubbed and partially condensed, further cooling and refluxing residual first off-gas to a final temperature between 145° F. whereby carbon dioxide is substantially completely removed from the residual gas phase and a final residual first off-gas stream is recovered substantially free of carbon dioxide, cooling and recycling a portion of said first aqueous ammonium carbamate solution, compressing the balance of said first solution, and combining and reacting said compressed solution with second streams of ammonia and carbon dioxide in an overall molar ratio of ammonia to carbon dioxide between about 2.5 to 1 and 4 to 1 at a pressure between about 2000 p.s.i.g. to 6000 p.s.i.g. and a temperature between about 320° F. to 430° F, whereby said components react to produce said second urea-containing stream.

2. Process of claim 1, in which said first urea-containing solution, prior to combining with said second urea-containing solution. is heated at a reduced pressure between about 200 p.s.i.g. to 400 p.s.i.g. to produce an off-gas rich in free ammonia, and said off-gas is scrubbed with a liquid ammonia stream, whereby an off-gas comprising excess ammonia substantially free of carbon dioxide is removed from said first solution.

3. Process of claim 1, in which the molar ratio of ammonia to carbon dioxide in the reactant streams employed to produce said first urea-containing solution is 6 to 1.

4. Process of urea synthesis comprising reacting first streams of ammonia and carbon dioxide in a molar ratio of about 6 to 1 at a pressure of 3500 p.s.i.g. and temperature of 365° F. to produce a first urea-containing stream, reducing the pressure of said first stream to about 260 p.s.i.g., heating said first stream to produce an off-gas rich in free ammonia, scrubbing said off-gas with liquid ammonia whereby said off-gas is recovered substantially free of carbon dioxide, combining said first stream of reduced free ammonia content with a second urea-containing stream, decomposing ammonium carbamate in the combined stream by heating at a temperature of 266° F. and pressure of about 250 p.s.i.g., separating a first off-gas containing ammonia and carbon dioxide from the combined stream, reducing the pressure of the residual combined stream to 15 p.s.i.g., decomposing the balance of ammonium carbamate in the residual combined stream by heating at a temperature of 200° F., separating a second off-gas containing ammonia and carbon dioxide from the final residual combined stream, said final residual combined stream consisting of product aqueous urea solution substantially free of process reactants, scrubbing and partially condensing said second off-gas by contact with a second aqueous ammonium carbamate solution at a temperature of about 135° F., further cooling and refluxing residual off-gas to a final temperature of 55° F. whereby carbon dioxide is substantially completely removed from the residual gas phase and a final residual second off-gas stream is recovered substantially free of carbon dioxide, cooling a portion of said second aqueous ammonium carbamate solution to 130° F. and recycling said portion to said contact, compressing the balance of said second solution to about 250 p.s.i.g., contacting said second solution and said first off-gas with a first aqueous ammonium carbamate solution at a temperature of about 210° F., whereby said first off-gas is scrubbed and partially condensed, further cooling and refluxing residual first off-gas to a final temperature of 115° F. whereby carbon dioxide is substantially completely removed from the residual gas phase and a final residual first off-gas stream is recovered substantially free of carbon dioxide, cooling a portion of said first aqueous ammonium carbamate solution to 205° F. and recycling said portion to said contact, compressing the balance of said first solution, and combining said compressed solution with second streams of ammonia and carbon dioxide at a pressure of 3500 p.s.i.g. and temperature of 365° F., whereby said components react in an overall ratio of ammonia to carbon dioxide of about 4 to 1 to produce said second urea-containing solution.

5. Process of urea synthesis comprising reacting first streams of ammonia and carbon dioxide in a molar ratio between about 4 to 1 and 10 to 1 at a pressure between about 2000 p.s.i.g. to 6000 p.s.i.g. to produce a first urea-containing stream, reducing the pressure of said stream to the range of 200 p.s.i.g. to 400 p.s.i.g., separating pure excess ammonia from said stream, adding a second urea-containing stream to said stream, decomposing ammonium carbamate in the combined stream by heating, separating a first off-gas containing ammonia and carbon dioxide from the combined stream, reducing the pressure of the residual combined stream to the range of 5 p.s.i.g. to 50 p.s.i.g., decomposing the balance of ammonium carbamate in the residual combined stream by heating at a temperature between about 180° F. to 250° F., separating a second off-gas containing ammonia and carbon dioxide from the final residual combined stream, said final residual combined stream consisting of product aqueous urea solution substantially free of process reactants, recovering ammonia and carbon dioxide from said first and second off-gas streams as aqueous ammonium carbamate solutions, compressing said recovered solutions to a pressure in the range of 2000 p.s.i.g. to 6000 p.s.i.g., combining said compressed solutions with second streams of ammonia and carbon dioxide to provide an overall molar ratio of ammonia to carbon dioxide between about 2.5 to 1 and 4 to 1, and reacting the resulting combined second process stream at a pressure between about 2000 p.s.i.g. to 6000 p.s.i.g. to produce said second urea-containing stream.

References Cited in the file of this patent
UNITED STATES PATENTS

| | | |
|---|---|---|
| 1,730,208 | Hetherington et al. | Oct. 1, 1929 |
| 1,898,093 | Miller | Feb. 21, 1933 |
| 2,116,881 | De Ropp | May 10, 1938 |
| 2,913,493 | Sze et al. | Nov. 17, 1959 |